Jan. 8, 1946.   W. TRAUPEL   2,392,623
GAS TURBINE PLANT
Filed June 3, 1943
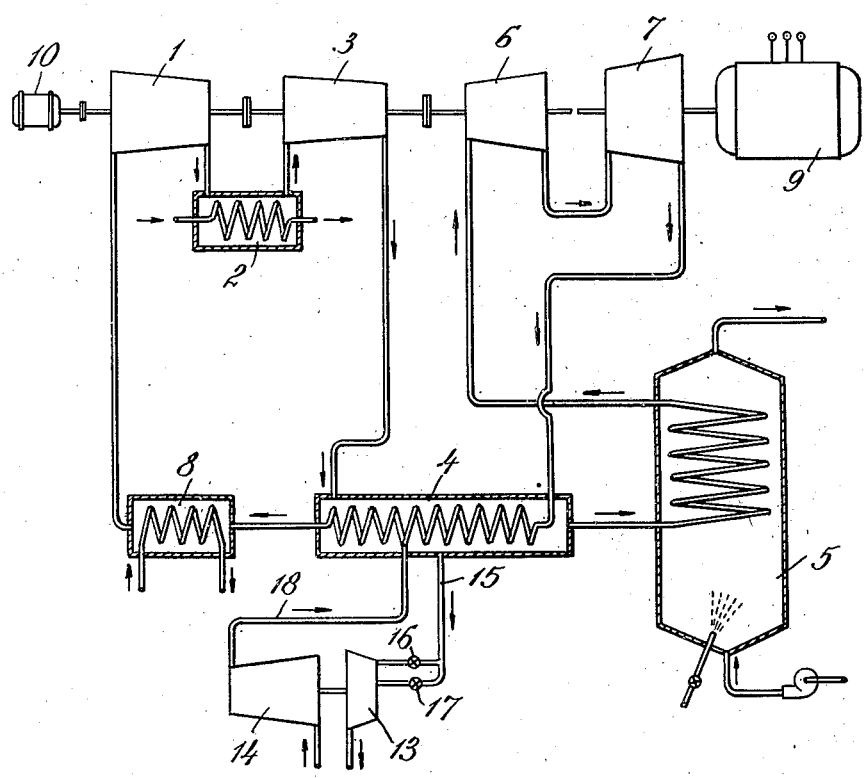
INVENTOR.
WALTER TRAUPEL
BY
ATTORNEYS Patented Jan. 8, 1946

2,392,623

UNITED STATES PATENT OFFICE 2,392,623

GAS-TURBINE PLANT

Walter Traupel, Winterthur, Switzerland, assignor to Sulzer Freres, Societe Anonyme, Winterthur, Switzerland Application June 3, 1943, Serial No. 489,470
In Switzerland July 10, 1942

3 Claims. (Cl. 60—59)

The invention relates to a gas-turbine plant in which at least a part of the working medium moves in a closed circuit and another part of the working medium is withdrawn from the circuit and led to an auxiliary turbine which is used for driving an auxiliary make-up compressor supplying air to replace the quantity of working medium removed from the circuit. The invention consists in that the auxiliary turbine is driven by working medium which is preheated in the circuit and brought at least approximately up to the highest pressure of the circuit, whilst the auxiliary compressor introduces the air at a part where the pressure in the circuit is lowest. The purpose of the invention is to be able, without the use of outside energy, to make up the losses occurring by escape of working medium through the stuffing-boxes and other leaky spots in the circuit.

Since the working medium adopted for driving the auxiliary turbine has a much higher pressure than the air led to the closed circuit, a greater quantity—without using any energy from outside—can be led in through the auxiliary make-up compressor to the closed circuit than is taken out through the auxiliary turbine from the closed circuit. The difference between the greater quantity led in and the smaller quantity taken out serves to make up losses of the working medium.

It will be found preferable to regulate the auxiliary turbine to which the extracted quantity is admitted, by varying the admission—for instance by closing and opening separate nozzles or groups of nozzles. The admission to the auxiliary turbine can be adjusted in accordance with a turbine of the closed circuit which does useful work. With increased admission, the output of the auxiliary turbine is increased, and the quantity delivered by the compressor is also correspondingly increased. In this manner the closed circuit is supercharged to a higher pressure level, so that the effective output of the whole plant is correspondingly increased.

Preferably the auxiliary turbine is designed as a constant-pressure turbine.

A gas-turbine plant according to the invention is described below with reference to the drawing.

From the low-pressure compressor 1 the working medium passes through an intermediate cooler 2 into the high-pressure compressor 3. In a heat-exchanger 4 acting as a heat recuperator, the compressed working medium is first of all preheated and then further heated in the gas heater 5. The compressed and heated working medium arrives first of all in the high-pressure turbine 6 and passes from it, after partial expansion and cooling, into the low-pressure turbine 7. After that, the working medium flows to the heat-exchanger 4 in which it transmits, to the compressed working medium, a part of its residual heat. A further part of the residual heat is then withdrawn from the working medium in cooler 8 by a cooling-medium. Finally it arrives again back in the low-pressure compressor 1 from where the above-described circuit begins again.

The high-pressure turbine 6 drives the two main compressors 1 and 3. Any excess output may be absorbed by the electric machine 10 coming into action as a generator. The machine 10 may also be used as a motor, for instance when the plant is being put into service. The low-pressure turbine 7 drives the electric generator 9, the energy from which is led away from the plant for use elsewhere.

The auxiliary turbine 13 is connected to the heat-exchanger 4 by the pipe 15. The working medium is led into turbine 13 through valve 16 or 17. Through the turbine 13 an auxiliary make-up compressor 14 is driven which draws in air, which it compresses, and then passes through pipe 18 into the heat exchanger 4. The pressure of the working medium used for driving the turbine 13 is already brought up to the highest pressure in the circuit by the compressor 3, and the temperature has been already considerably raised by a part of the heating surface of the heat-exchanger 4. Through the auxiliary compressor 14 the air is led in at a place shortly before the low-pressure compressor 1, where practically the lowest pressure of the circuit is to be found.

In the closed circuit of the plant, pure air may be circulated as in the described example. The auxiliary turbine then receives air as the gaseous working medium.

I claim:

1. In a gas turbine plant having a low pressure compressor and a high pressure compressor connected in series and operating on the same shaft, cooler means in series with said compressors, a high pressure turbine for driving said compressors, a low pressure turbine for driving a load, a heat exchanger acting as a heat recuperator, a conduit in the heat exchanger, a heater; conduits for passing compressed air through the compressors, the heat exchanger, the heater, the high pressure turbine, the low pressure turbine, the conduit in the heat exchanger in heat-exchange contact with the air passing through the heat exchanger from the high pressure compressor to the heater, and from the conduit in the heat exchanger through the cooler means to the low pressure compressor, the improvement which comprises an auxiliary turbine, a conduit connecting the auxiliary turbine with the heat exchanger for supplying the auxiliary turbine with high pressure preheated gas, an auxiliary compressor for make-up air driven by the auxiliary turbine, and a conduit for passing the make-up air from the auxiliary make-up compressor into the conduit in the heat exchanger at a point where the pressure is relatively low.

2. In a gas turbine plant having main compressor means, a heat exchanger acting as a heat recuperator, cooler means in series with said compressor means and the heat exchanger, a gas heater, heating the working medium by means of heat exchange contact through a heating surface, main turbine means driving partly said compressor means and partly a load, conduit means for passing compressed gaseous working medium from said compressor means to the heat exchanger, conduit means for passing working medium from the heat exchanger to the gas heater, conduit means for passing heated working medium from the gas heater to said turbine means, conduit means for passing expanded working medium from said turbine means into heat exchange with the compressed working medium in the heat exchanger, conduit means for passing working medium from the heat exchanger to said cooler means, conduit means for passing working medium from said cooler means to said compressor means, so as to form a circuit of working medium through the compressor means, the heat exchanger, the gas heater, the turbine means, back through the heat exchanger and through the cooler to the compressor, the improvement which comprises an auxiliary turbine, conduit means connecting the auxiliary turbine with the circuit at a point where the pressure is relatively high, an auxiliary compressor for working medium to replace the losses of working medium in the circuit, said auxiliary compressor being driven by the auxiliary turbine, and conduit means for passing the compressed replacing working medium from the auxiliary compressor into the circuit at a point where the pressure is relatively low.

3. A gas turbine plant working with a closed circuit of a gaseous working medium which is first compressed in main compressor means, then heated by means of heat exchange in a gas heater, then expanded in main turbine means, and thereafter cooled and conducted back to the compressor comprising an auxiliary turbine driven by gases extracted from the circuit at a point where the pressure is relatively high, an auxiliary compressor for working medium to replace the losses of working medium in the circuit, said auxiliary compressor being driven by the auxiliary turbine, and means for introducing the compressed replacing working medium into the circuit at a point between the main turbine means and the main compressor means.

WALTER TRAUPEL.